United States Patent Office 2,843,554
Patented July 15, 1958

2,843,554

READY-MIXED ALUMINUM COATING COMPOSITIONS AND ARTICLES COATED THEREWITH

Clyde G. Murphy, Springfield, Pa., assignor to E. I. du Pont de Nemours and Company, Wilmington, Del., a corporation of Delaware No Drawing. Application April 6, 1954
Serial No. 421,441

7 Claims. (Cl. 260—19)

This invention relates to aluminized oleoresinous coating compositions. More particularly it relates to a ready-mixed, package-stable liquid aluminized oleoresinous coating composition characterized by retention of leafing value when stored under conditions which are degrading to the leafing of conventional aluminized coating compositions.

Aluminum pastes and powders are divided into two main classes, leafing type and non-leafing type. Each type is further classified by the average particle size of the aluminum pigment and particle size distribution. In the depositing of aluminized coating compositions that are to simulate smooth polished aluminum metal sheet or chrome plating, it is essential that the aluminum pigment be of the leafing type and that the vehicle not have a degrading effect on the leafing value. The lamellar pigment particles overlap to provide an apparently continuous strata of pigment particles which has the appearance of polished metal. The larger pigment particles generally provide the brightest metallic appearance, but their size cause them to be deposited as a rough surface rather than as a smooth apparently polished surface. While use of the smaller sized particles generally results in some loss in reflectance, a highly desirable metallic appearing coating which is smooth and glossy can be obtained through use of the very fine particle size aluminum pigment in accordance with this invention.

The nature of the vehicle is an important factor controlling the leafing activity of the aluminumized coating composition. Although a composition is formulated with a leafing type pigment, the resulting coating may be lacking in metallic appearance because of degrading action of the vehicle on the leafing value of the pigment. For example, poor leafing generally occurs with cellulose nitrate lacquer vehicles. Solvents as well as the film-forming components affect the leafing value. Esters, ketones and alcohols commonly used in lacquer formulation are detrimental to leafing value.

Loss of leafing value occurs in the package of ready-mixed coating compositions during storage at room temperature and the loss is accelerated when the coating composition is vigorously agitated or stirred when the coating composition is aerated as in dip application procedures.

Packaging of aluminized coating compositions as a two package system of separtely packaged vehicle and separately packaged aluminum powder or paste pigment to be combined shortly before use has been a remedial procedure for avoiding loss of leafing value. This remedy, while acceptable in small scale coating operations, is undesirable in large scale commercial coating operations where volume turnover is great and it is inconvenient to handicap production line operations with small batch-wise mixing of aluminized coating compositions. Further, the commercial user usually prefers a ready-mixed composition of uniform quality.

Use of aluminized coating compositions in large scale dip-coating operations are particularly problematic in regard to retention of leafing value. In such operations, a large volume of coating composition is exposed to the atmosphere and to aeration by immersion and withdrawal of the article being coated. In addition the coating bath must be adequately agitated to maintain the aluminum pigment in uniform suspension. Atmospheric exposure, aeration and agitation of the liquid coating are all detrimental to leafing activity and in consequence, an article coated early in a run with fresh coating composition stock has a better simulated metal appearance than an article coated a day later from the same stock.

This invention is particularly directed toward overcoming the deficiencies of ready-mixed aluminum coating compositions adapted for large scale dip-coating operations.

It is an object of this invention to provide a ready-mixed aluminized liquid coating composition which simulates polished metallic aluminum sheet or chrome plating. Another object is to provide a package-stable aluminized liquid coating composition in a ready-mixed state. A further object is to provide a stable ready-mixed aluminized liquid coating composition resistant to the deteriorating action on leafing value by aeration, agitation and exposure to the atmosphere. A still further object is to provide a ready-mixed aluminized coating composition which by dip-coat application deposits a smooth uniform-appearing, metal simulating finish. Additional objects will become apparent as the description of the invention proceeds.

These objects are accomplished by mixing an extra fine particle size leafing type aluminum pigment in a liquid oleoresinous vehicle comprising a film-forming oleoresinous esterification product of (1) rosin acids, (2) a mixture of higher fatty acids containing a preponderance of polyethenoid acids and (3) an esterifiable epoxyhydroxy polyether resin which is a condensate of a chlorohydrin selected from the group consisting of epichlorohydrin and glycerol dichlorhydrin and a bis (4 hydroxyphenyl) alkane, and a volatile hydrocarbon solvent for said resinous ester to form a ready-mixed aluminized coating composition. The invention contemplates coating the ready-mixed composition on a heat-resistant rigid substrate and heating the coated substrate at a temperature of at least 300° F. to cure the coating. The invention further contemplates superimposing a transparent protective coating over the curved aluminized coating.

The following examples are presented by way of illustration and the invention is not intended to be limited thereby except as specified in the appended claims. Throughout the specification and claims the parts are expressed on a weight basis unless otherwise designated.

EXAMPLE I

*Ready-mixed aluminized coating composition*

Part 1: Parts by wt.
Aluminum paste (65% aluminum and 35% mineral spirits) _____ 14.6
Xylol _____ 14.6
Part 2:
Ester resin A (65% non-volatile) _____ 35.8
Xylol _____ 34.2
Manganese drier—mineral spirits solution (3% Mn) _____ 0.2
Guaiacol inhibitor (10% solution in hydrocarbon solvent) _____ 0.6

100.0

The aluminum paste was the grade commercially known as extra fine lining leafing type conforming to ASTM designation D962–49 type II class A. The aluminum pigment was characterized by a particle size corresponding to 100% passage through a 325 mesh screen, i. e., less than 0.1% was retained on the screen, and at least 98% passed through a 400 mesh screen. This aluminum pigment had a theoretical available covering area on water of about 27,000 square centimeters per gram of metal. The average leafing value for the aluminum paste in a standard test vehicle comprised of a coumarone indene resin was 70% for a 1.5 gram sample and at least 80% for a 2 gram sample of paste. The moisture content of the paste was less than 0.15%.

The standard test procedures for the characterization of the aluminum paste and powdered aluminum pigments are described in the publication "Methods of Tests of Alcoa Albron Pigments," copyright 1947— Aluminum Company of America, Pittsburgh, Pa., and under ASTM designation D480–48.

The ester resin A was prepared in accordance with the following procedure:

ESTER RESIN A

| | Parts by wt. |
|---|---|
| Esterifiable epoxyhydroxy polyether resin ("Epon" 1004) | 28.0 |
| Rosin (commercial WG grade) | 6.2 |
| Linseed oil acids | 31.6 |
| Xylol | 17.1 |
| Mineral spirits | 17.1 |
| | 100.0 |

The above components, except the solvents, were charged into a closed pre-melt kettle and heated under an inert gas blanket to a temperature of about 410° F. Thereafter the molten charge was transferred to a reaction kettle and heating was continued for a two hour period while the temperature was gradually increased to 480° F. Inert gas was blown through the molten charge at a slow rate during the reaction period. When the acid number of the reaction product was reduced to 8 or lower, heating was stopped and the solvent was added to thin the ester resin to about 65% non-volatile content. At this concentration, the viscosity of the resin solution was in the range of Z to $Z_2$ on the Gardner-Holdt scale. In this resin, the rosin acids neutralized about 11.3% of the ester equivalent of the polyether resin and the linseed oil acids neutralized about 70.6%. About 18.1% of the equivalent was unneutralized.

The esterifiable epoxyhydroxy polyether resin ("Epon" 1004) was a commercial condensation product of epichlorohydrin with 2,2-bis (4 hydroxyphenyl) propane reacted in an alkaline solution.

One hundred parts of the above coating composition were thinned with 30 parts of xylol and the thinned composition was applied by dip coating to suitably prepared 4 x 12 inch panels of steel which had been coated with zinc and bonderized. The panel was immersed in the coating bath and withdrawn from the bath at a rate of two feet per minute. A single coat of the composition was applied. The coating was cured by heating the coated panel for 15 minutes at an oven temperature of 350° F. The dry film thickness of the single coat was 0.35 mil. The cured coating was bright and smooth and represented a highly desirable simulation of polished aluminum metal. The surface of the panel could be easily smudged by handling and in order to prevent smudging and other surface deterioration, the metallic appearing surface was protected by a superimposed transparent top-coat finish. Part 2 of the above coating composition is suitable for top-coating the metallic finish.

Samples of the liquid composition of Example I were stored in hermetically sealed containers at 77° F. and at 120° F. to determine the package stability. The liquid samples were examined periodically for gassing, viscosity increase or gelling, settling of the aluminum pigment and loss of leafing value. The ready-mixed aluminized coating composition did not release any gaseous decomposition products in sufficient concentration during 10 months' storage to cause a detectable increase in pressure in the container. The material retained its initial viscosity and panels prepared from the aged samples duplicated the desirable metallic appearance of the original panels prepared from the fresh coating composition.

Another set of samples of the liquid coating composition of Example I were subjected to an accelerated aeration test to predetermine the behavior of the liquid coating composition in a dip coating process. In carrying out the accelerated test 200 ml. of liquid composition were measured into a 16 ounce wide mouth bottle fitted with a two-hole stopper and 7 mm. outside diameter glass tubing serving as an air inlet and as an air outlet. The inlet tube extended to within ½ inch of the bottom of the bottle and the outlet tube protruded ½ inch below the stopper. The outlet tube was connected to a rotameter and the inlet tube was connected in series with a similar aeration bottle which in turn was connected to an air supply. The bottle adjacent to the air supply was filled with 200 ml. of the solvent mixture of the composition of Example I. Compressed air reduced to 30 pounds pressure was initially bubbled through the solvent mixture and then through the coating composition in turn at a rate of 565 ml. per minute. The aerated sample showed no visual change in appearance during 200 hours of aeration. Test slides of the original material and the aerated material were equal in appearance. There was no visual difference in the metallic appearance of a panel coated with the aerated composition and a panel coated with the same composition immediately after its preparation.

These tests on the liquid coating composition indicated that the ready-mixed product was adequately stable for a year or longer.

In a practical test, refrigerator evaporator units fabricated with hot-dip zinc coated steel and then bonderized were dip-coated on a production line using the thinned coating composition as described above. The withdrawal rate was 2 feet per minute and the coating was cured by heating for 15 minutes in an oven maintained at a temperature in the range of 350 to 375° F. The coated evaporator had the appearance of being fabricated of aluminum metal. The simulation was equivalent to that carried out on the described panels.

EXAMPLE II

*Ready-mixed aluminized coating composition*

| | Parts by wt. |
|---|---|
| Part 1: | |
| Ester resin A—65% non-volatile (same as Example I) | 36.0 |
| Xylol | 38.2 |
| Manganese drier solution (same as Example I) | 0.2 |
| Guaiacol inhibitor (10% solution in hydrocarbon solvent) | 0.6 |
| Part 2: | |
| Dry aluminum powder—Alcoa #422 | 15.0 |
| Xylol | 10.0 |
| | 100.0 |

The vehicle constituents were identical with those used in Example I. The aluminum powder pigment had the same physical characteristics as the aluminum pigment used in paste form in Example I. This pigment conforms to ASTM designation D962–49 type I, class A. On a weight basis, the pigment content of Example II is 58% greater than that of Example I.

In preparing the above coating composition, part I was mixed until uniform, then part II was added thereto and thoroughly mixed.

The composition was thinned with hydrocarbon solvent mixture to a dip-coating viscosity of 17 seconds Zahn #2 cup. Bonderized zinc coated steel test panels dip-coated with the above Example II coating composition and processed as described for Example I duplicated the desirable simulated metal appearance obtained with the coating composition of Example I.

The liquid composition was storage stable and resistant to aeration without loss of leafing power. The stored samples showed no viscosity increase and no gassing.

The preferred content of aluminum pigment is about 40 to 65 parts per 100 parts by weight of oleoresinous esterified epoxyhydroxy polyether resin. Ready-mixed coating compositions conforming to the objects of this invention and useful for obtaining adequate coverage with a single coat at a film thickness of about 0.3 mil were prepared having an aluminum pigment content in the range of about 30 to 100 parts per 100 parts by weight of esterified polyether resin.

Results comparable to those obtained in Examples I and II were obtained when the ester resin A was replaced on a pound for pound basis with ester resin B described below:

ESTER RESIN B

| | Parts by wt. |
|---|---|
| Esterifiable epoxyhydroxy polyether resin ("Epon" 1004) | 29.0 |
| Rosin (commercial WG grade) | 7.2 |
| Coconut oil acids | 4.2 |
| Linseed oil acids | 25.5 |
| Xylol | 17.0 |
| Mineral spirits | 17.1 |
| | 100.0 |

The resin was prepared by the same fusion method as described in the preparation of ester resin A and, when the acid number was 8 or lower, the resin was thinned to 65% non-volatile content. In this resin, about 12.5% of the ester equivalent of the polyether resin was neutralized with rosin acids, 12.5% with coconut oil acids and 55% with linseed oil acids. About 20% of the equivalent was unreacted.

While the fusion method of resin preparation is specifically described for the ester resins A and B, the solution method may be used alternatively.

While the examples of the ester resins, for the sake of avoiding undue repetition, show the use of a single species of esterifiable epoxyhydroxy polyether resin, other polyether resins derived from the same reactants, but having either a lower or higher average molecular weight, may be directly substituted for the polyether resin specified in the described ether resins. Useful ester resins have an acid number less than about 10, preferably about 5. Suitable epoxyhydroxy polyether resins have an average molecular weight in the range of about 600 to 2500 and an esterification value in the range of about 125 to 200.

Still other esterifiable polyether resins which may be used in the preparation of ester resins satisfactory for formulation of ready-mixed aluminized coating compositions of this invention include those in which the bis (4 hydroxyphenyl) alkane is bis (4 hydroxyphenyl) methane, 1,1 bis (4 hydroxyphenyl) ethane, 2,2 bis (4 hydroxyphenyl) butane and 1,1 bis (4 hydroxyphenyl) isobutane.

The esterifiable epoxyhydroxy polyether resins may be prepared in accordance with the procedure described in Greenlee U. S. Patent 2,456,408, issued December 14, 1948, and U. S. Patent 2,503,726, issued April 11, 1950.

While the concentration of esterified rosin acids in ester resins A and B is representative of the preferred proportion in the range of 10% to 15% of the ester equivalent of the epoxyhydroxy polyether resin, the presence of as little as 5% of ester equivalent of rosin acids was found to provide a detectable improvement in simulated metallic appearance. For serviceability, it is desirable that not more than 25% of the ester equivalent of the epoxyhydroxy polyether resin is neutralized with rosin acids, at least 50% is neutralized with a mixture of higher fatty acids in which polyethenoid higher fatty acids are in preponderance and at least about 10% of the equivalent is unneutralized.

The minor proportion of the fatty acid mixture in ester resins A and B may include monoethenoid higher fatty acids such as oleic and ricinoleic acids and saturated higher fatty acids in the proportions as they occur naturally in drying oils. Semi-drying oil acids and non-drying oil acids may be combined with drying oil acids to provide compounded higher fatty acid mixtures for esterification of the epoxyhydroxy polyether resin, but the polyethenoid components should be in preponderant proportions. Suitable drying oil acids which contain preponderant proportions of polyethenoid monocarboxylic acids that may be used in the practice of this invention include linseed oil acids, oiticica oil acids, perilla oil acids, tung oil acids, safflower oil acids, sunflower oil acids, soybean oil acids, and dehydrated castor oil acids.

Aluminum pigment suitable for formulation of the ready-mixed aluminized coating compositions of this invention conform to the specification ASTM designation D962–49 class A of types I and II identifying extra fine lining fineness leafing aluminum pigment for special finishes, subject to the further limitations that a least 98% of the pigment shall pass through a 400 mesh screen and that the average leafing value for the powder shall be at least 60% for a one gram sample and at least 65% for a 1.5 gram sample of aluminum paste at 65% non-volatile content. The said specification ASTM designation D962–49 requires a minimum leafing value of 50% for the powder and 55% for the paste and the particle size shall be such that not more than 0.1% is retained on a 325 mesh screen.

Aluminum pastes and powders of the leafing type meeting the limited requirements of this invention are commercially available from several independent suppliers. Some paste grades show an average leafing value of better than 70% at 1.5 grams and better than 85% at 2.0 grams and these are particularly preferred for use in the practice of this invention.

The solvent composition of the vehicle shall be comprised essentially of volatile hydrocarbons, preferably predominating in volatile aromatic hydrocarbons such as xylol and toluol. Mixtures of these aromatic hydrocarbon solvents in combination with aliphatic hydrocarbons such as V. M. and P. naphtha and mineral spirits having adequate solvency for the ester resin may be used as well as commercially available high solvency petroleum naphthas having a substantial aromatic content. It is necessary to avoid the use of volatile esters, alcohols and ketones in significant amounts because of the deteriorating effect on leafing. Another fault in the use of these typical lacquer solvents is that they generally are not adequately free of water for use in an aluminized coating composition. The water reacts with the aluminum to cause decomposition and gassing. The stable ready-mixed coating compositions of this invention preferably have a water content of less than 0.15% and generally less than 0.1% by weight.

While the total non-volatile content of the vehicle may vary widely, it is desirable that the solids be sufficient to provide a film thickness of at least about 0.3 mil in a single coat. An oleoresinous esterified polyether resin content of at least about 15% will provide this desired single-coat thickness. Ready-mixed alumnized coating compositions having an oleoresinous esterified polyether resin content greater than about 40% and an aluminum content of at least 30 parts per 100 parts of ester resin by weight are too viscous for practical consideration as ready-mixed compositions and require extensive thinning prior to use.

Various modifying adjuvants may be included in the coating composition as a small percentage thereof providing they are non-reactive at the storage temperature and resist aeration, such as, for example, plasticizers and resinous extenders which are soluble in the hydrocarbon solvent. Pigmentation, while permissible, is not practical because the principal object is optimum simulation of metallic appearance and coloring with pigments and dyes detracts from the simulated metallic appearance.

The ready-mixed aluminized coating compositions of this invention are applicable by any of the conventional methods, application by dipping or spraying being preferred. The coatings may be applied to metallic and non-metallic substrates. The coatings are less useful on non-metallic organic substrates because relatively few non-metallic substrates satisfactorily withstand the baking conditions necessary to cure the oleoresinous ester vehicle. In preparation of articles having a simulated metal appearance it is necessary that the surface of the substrate be substantially smooth as any surface roughness or peculiar pattern detracts from the desired uniformity of simulated metal appearance.

This invention provides means of supplying stable ready-mixed aluminized coating compositions long sought by industry which will deposit films having an optimum degree of metal simulation and which resist degradation of this quality during long storage periods and during aeration.

It is apparent that many widely different embodiments of this invention can be made without departing from the spirit and scope thereof; and, therefore, it is not intended to be limited except as indicated in the appended claims.

I claim:

1. A ready-mixed aluminized liquid coating composition characterized by package stability during lengthy storage and retention of leafing value during said storage, comprising an oleoresinous esterified polyether resin, fine particle size leafing-type aluminum pigment in the proportion of 30 to 100 parts for each 100 parts of said esterified polyether resin, and a volatile hydrocarbon solvent for said esterified polyether resin, said aluminum pigment having a fineness corresponding to at least 99.9% passage through a 325 mesh screen and at least 98% passage through a 400 mesh screen and further characterized by an average leafing value of at least 65% measured with a 1.5 gram sample of pigment paste having a non-volatile content of 65% and at least 60% when measured with a 1 gram sample of dry aluminum powder, said oleoresinous esterified polyether resin comprising the esterification product of a mixture of higher fatty acids containing a preponderance of polyethenoid higher fatty acids, rosin acids and an esterifiable polyether resin, said polyether resin comprising the condensation product of a chlorohydrin reacted with a bis (4 hydroxyphenyl) alkane, said chlorohydrin being a member of the group consisting of epichlorohydrin and glyceroldichlorohydrin.

2. The composition of claim 1 in which the said aluminum pigment is present in an amount corresponding from 40 to 65 parts for each 100 parts of oleoresinous esterified polyether resin.

3. The composition of claim 1 in which from 5 to 25% of the esterification equivalent of the epoxyhydroxy polyether resin is neutralized with rosin acids.

4. The composition of claim 1 in which the esterification equivalent of said epoxyhydroxy polyether resin is 50 to 75% neutralized with said mixture of higher fatty acids and 10 to 15% neutralized with rosin acids.

5. The composition of claim 1 in which said epoxyhydroxy polyether resin is a condensate of epichlorohydrin with 2,2 bis (4 hydroxyphenyl) propane.

6. A metal substrate having a dry cured surface coating of the composition of claim 1.

7. The method of preparing a ready-mixed aluminized liquid coating composition comprising the esterification product of an esterifiable polyether resin, rosin acids and a mixture of higher fatty acids containing a preponderance of polyethenoid acids in hydrocarbon solvent, which comprises mixing said esterification product with fine particle size leafing-type aluminum pigment in the proportion corresponding to 30 to 100 parts of said pigment per 100 parts of said esterified polyether resin, said aluminum pigment being characterized by a fineness corresponding to at least 99.9% passage through a 325 mesh screen and at least 98% passage through a 400 mesh screen and a leafing value of at least 65% for a 1.5 gram sample of pigment paste and at least 60% for a 1 gram sample of dry pigment powder, said esterifiable polyether resin comprising a condensate of a chlorohydrin and a bis (4 hydroxyphenyl) alkane, said chlorohydrin being a member of the group consisting of epichlorohydrin and glyceroldichlorohydrin.

References Cited in the file of this patent

UNITED STATES PATENTS 2,662,027    Pike _____ Dec. 8, 1953

OTHER REFERENCES

Edwards: "Aluminum Paint and Powder," 2nd ed., page 10, Reinhold Pub. Cor., New York, N. Y., 1936.

Epon Resins for Surface Coatings, Shell Chemical Co., November 1952, pages 18, 19 and 24.

Mattiello: Protective and Decorative Coatings, vol. 11, 1942, page 557.

Araldite, Technical Sheet from Ciba Co., March 1952.